Aug. 19, 1969   J. E. FARMER   3,461,839
APPARATUS FOR CLEANING AND FLUXING BATTERY PLATE LUGS
Filed Oct. 30, 1967

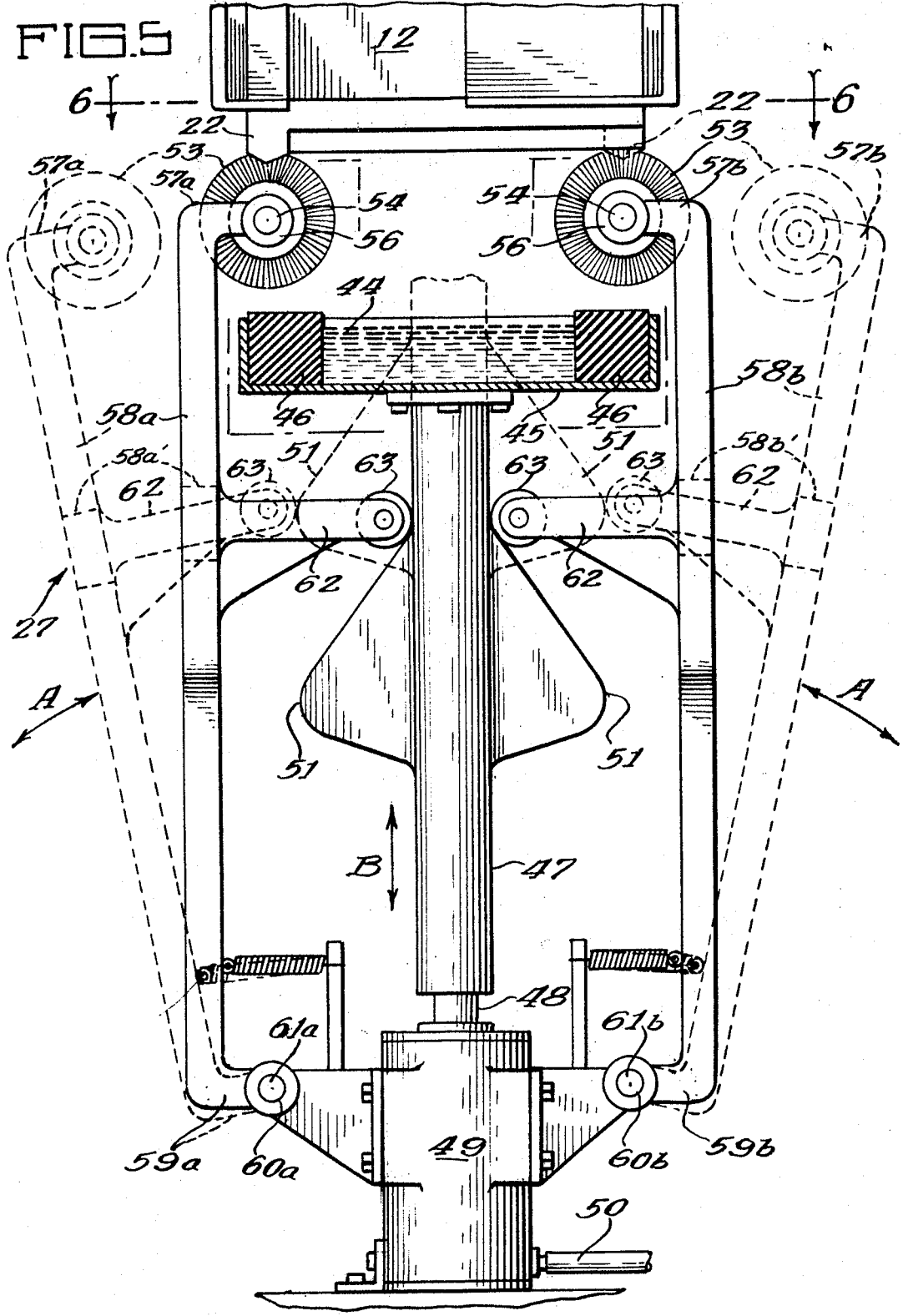

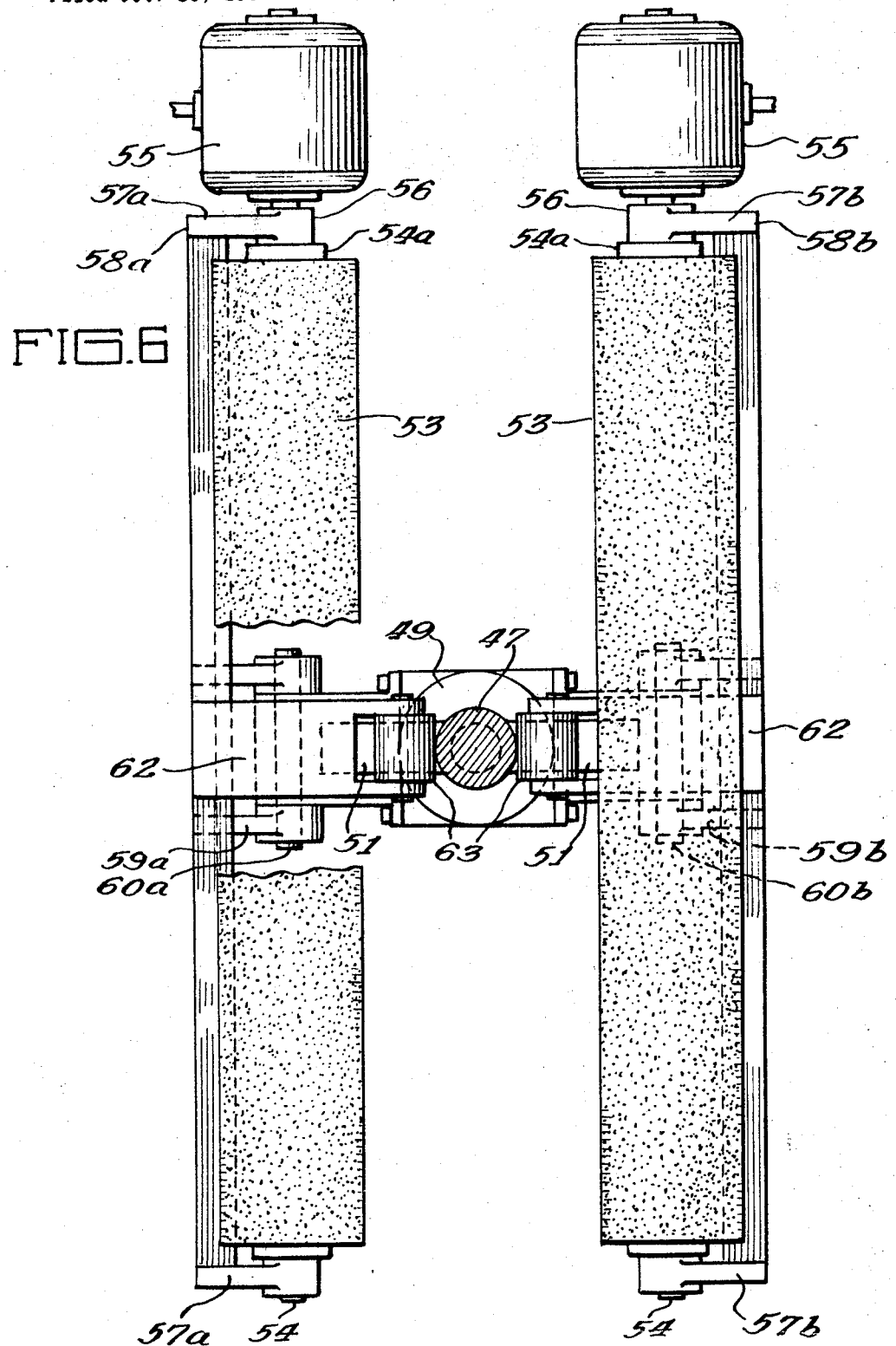

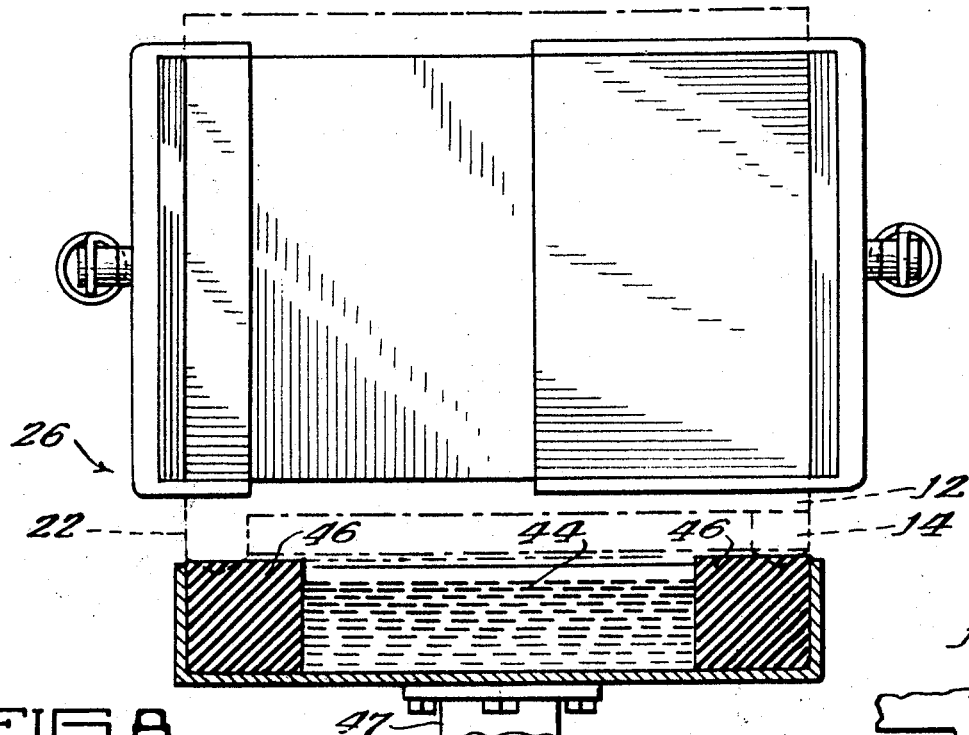
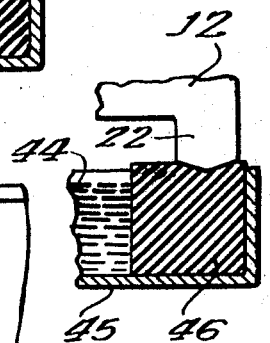
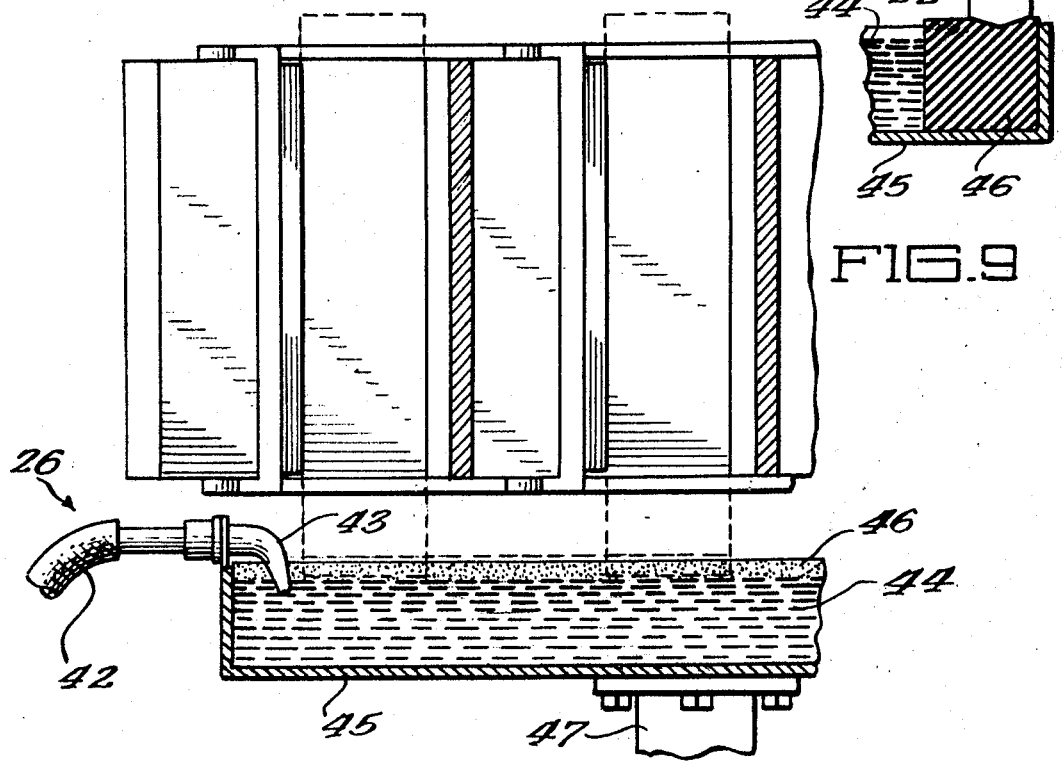

United States Patent Office 3,461,839
Patented Aug. 19, 1969

3,461,839
APPARATUS FOR CLEANING AND FLUXING BATTERY PLATE LUGS
John E. Farmer, Chicago, Ill., assignor to Farmer Mold and Machine Works, Inc., a corporation of Illinois
Filed Oct. 30, 1967, Ser. No. 679,093
Int. Cl. B05c 3/02; A46b 13/02
U.S. Cl. 118—74                               11 Claims

ABSTRACT OF THE DISCLOSURE

A fluxing station for a battery fabricating machine wherein driven brushes are provided for cleaning battery plate lugs to be fluxed, the brushes being mounted for movement to and from the plate lugs and means to effect movement of a flux holding tray for application of the flux simultaneously effecting said movement of the brushes.

BACKGROUND OF THE INVENTION

Field of the invention

This invention relates to battery fabricating machines and more particularly to an improvement in the fluxing station of such machines.

Description of the prior art

In the art of fabricating battery elements by the "cast-on" method, there has arisen the need for properly cleaning lugs of battery plates prior to placing the lugs in a mold wherein molten lead is introduced to form the strap which bridges the several lugs of a battery group. Mechanisms for carrying out the cast-on method of battery assembly have been disclosed in Vieth Patent No. 2,799,905, issued July 1957, and Sabatino et al. Patent No. 3,253,306, issued May 31, 1966, as well as my own copending application entitled "Battery Element Fabricating Machine," filed June 29, 1967, S.N. 650,119.

Generally speaking, the lugs of the battery plates are prepared for receiving molten lead by applying a liquid fluxing solution to the lugs to cleanse the lugs. Sabatino et al. Patents Nos. 3,087,005; 3,299,339; and 3,238,579, as well as Bronstert Patent No. 3,072,984, all deal with methods for improving the fusion between the cast strap and the lugs on the battery plates by means for various procedures. The Sabatino patents proposed different solutions, such as heating the fluxing solution, heating the lugs themselves, or providing a fluxing solution having specified volatility characteristics. The Bronsert patent suggests a controlled immersion rate of the lugs at the casting station. In my co-pending battery fabricating machine application, the unique structure afforded at the casting station results in a satisfactory fusion between the plate lugs and the cast strap with the simple preparation of applying well-known flux solutions to the battery lugs at ambient temperatures prior to inserting the lugs in the mold at the casting station.

A growing practice in the battery fabrication art is to charge the plates prior to fabricating the plates and separators into groups and assembling the groups into battery casings. Such pre-charged plates are referred to as being "formed." When plates are "formed," an oxide is produced on the lugs of the plates. This oxide is not easily removed by fluxing, including fluxing procedures suggested in Sabatino patents. Therefore a need has arisen to provide a satisfactory means for cleaning lugs of "formed" plates prior to advancing the lugs to a casting station wherein the post and strap elements are to be fused to the lugs of plates of battery elements for fabricating plates and separators into battery groups.

SUMMARY OF THE INVENTION

This invention is directed, in brief, to the provision of an improved means for preparing lugs of battery plates for fusion with strap structure which bridges the plates to thereby fabricate plates and interposed separators into battery groups, by providing a mechanical abrading means for cleaning the plate lugs prior to subjecting the lugs to fusion with the strap portions.

The best mode presently contemplated for carrying out the invention includes the utilization of driven brushes positioned at the fluxing station of a battery fabricating machine with the brushes being mounted on pivoted arms for movement into and out of engagement with plate lugs for cleansing the same, and permitting the application of a fluxing solution to the lugs subsequent to the abrading action afforded by the brushes.

BRIEF DESCRIPTION OF THE DRAWINGS

FIGURE 5 is a fragmentary enlarged view of the fluxing station of the battery fabricating machine showing the lugging cleaning means of this invention in greater detail;

FIGURE 6 is a partially broken section view taken generally along the lines 6—6 of FIGURE 5;

FIGURE 7 is an enlarged end view of the fluxing station showing the element carrier positioned with the lugs oriented downwardly and with the fluxing tray moved upwardly into absorbing engagement with the lugs held in the carrier;

FIGURE 8 is a fragmentary side elevational view of the components shown in FIGURE 7; and FIGURE 9 is a fragmentary section view of a portion of FIGURE 7 showing the engagement of a lug of a battery plate with a saturated sponge element of the fluxing tray in greater detail.

DESCRIPTION OF THE PREFERRED EMBODIMENT

Figure 3:
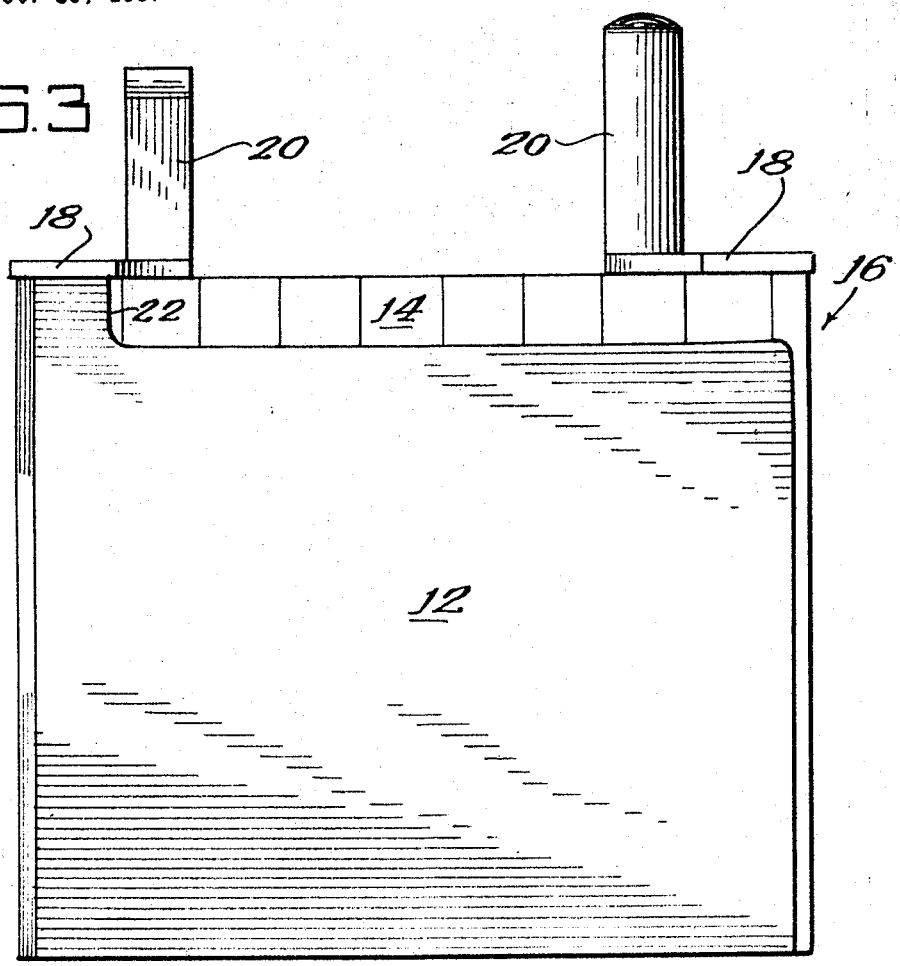
FIGURE 3 is an elevational view of a completed group of battery plates and spacer elements held together by straps having upwardly projecting posts.
Figure 4:
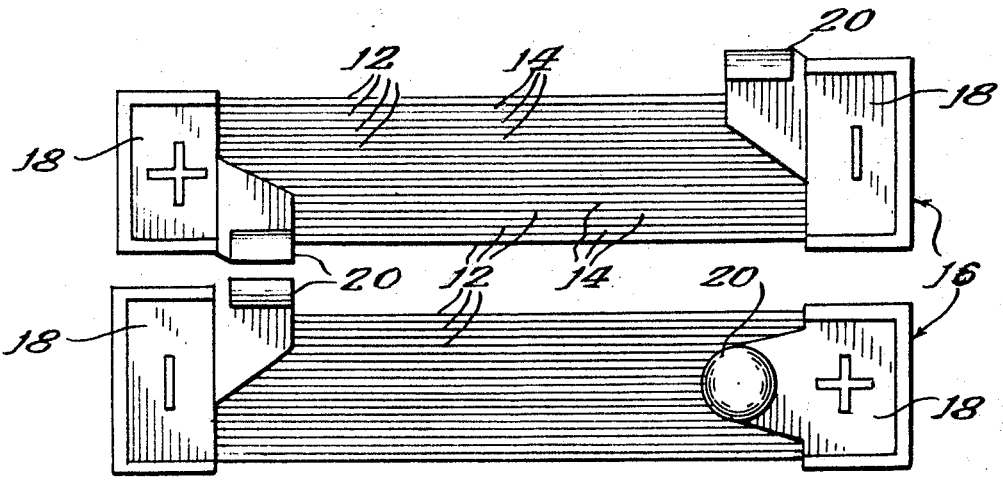
FIGURE 4 is a top plan view of two such completed groups as shown in FIGURE 3.

Battery element fabricating or assembly machine 10 is utilized in joining a number of battery plates 12 together for use in the cells of a storage battery. As best seen in FIGURES 3 and 4, plates 12 and separators 14 are assembled into groups 16 by fusing straps 18 and posts 20 on the lugs 22 of the plates. The illustrated machine 10 fuses such straps and posts onto the lugs to produce battery groups by the so-called "cast-on" method. Generally, battery plates 12 are grid-like structures with a lug 22 projecting outwardly along one side of the top of the plate as shown in more detail in Sabatino et al. Patent No. 3,249,981. For simplicity of illustration, the plates are shown herein as being solid, but it is to be understood that in actual practice, the plates consist of a metallic grid, generally of lead, with an electrolytic activated paste bonded to the grid.

Generally speaking, the battery element fabricating machine 10 includes a loading station 24, wherein plates and separators are loaded; a fluxing station 26, wherein flux from a fluxing pot 26a may be applied to the lugs of the plates, and wherein the brushing or mechanical abrading means 27 of this invention may also be located for cleaning the lugs; a casting station or molding station 28, wherein molten lead 29b is fed by pressure flow from a lead vat 29a and cast to the previously fluxed lugs 22; and an unloading station 30, wherein the completed groups 16 are dropped onto a shelf or other suitable surface from which the groups 16 may be carried to be installed in a battery casing.

The machine 10 is provided with a frame including a plurality of upright legs 32 and a base 33, and housing means enclosing the frame including a plurality of side panels 35 and a top cover panel 36. A column 38 is generally centrally positioned with respect to the machine and is mounted in the machine for vertical movement and rotational movement. Arms 39 extend radially outwardly from a hub connected to the top of the column 38. The arms 39 each support group carriers 40 that extend radially outwardly from each arm for holding the battery plates and separators as the several fabricating operations are performed at the different stations. The carriers 40 are rotatable relative to the arms 39 and the arms are movable with the column 38. Generally speaking, the operation of the machine 10, including the mechanism for driving the column 38, rotating the carriers 40, and moving the carriers between an element holding and element loading or unloading condition, is described in detail in my aforementioned co-pending application Serial Number 650,119.

As described in my aforesaid co-pending application, the element carriers 40 are rotated to hold the elements at the fluxing and casting station of the machine with the lugs of the plates oriented downwardly. However, it is to be understood that the structure of my preferred embodiment to be described herein is not limited to use in the particular machine herein disclosed nor is it limited for use in a machine wherein the battery plates are presented at the fluxing station with the lugs oriented downwardly. Rather, it is envisioned that the invention could be utilized in a fluxing station wherein the lugs of the battery plates extend horizontally outwardly, or vertically upwardly, as well.

Figure 1:
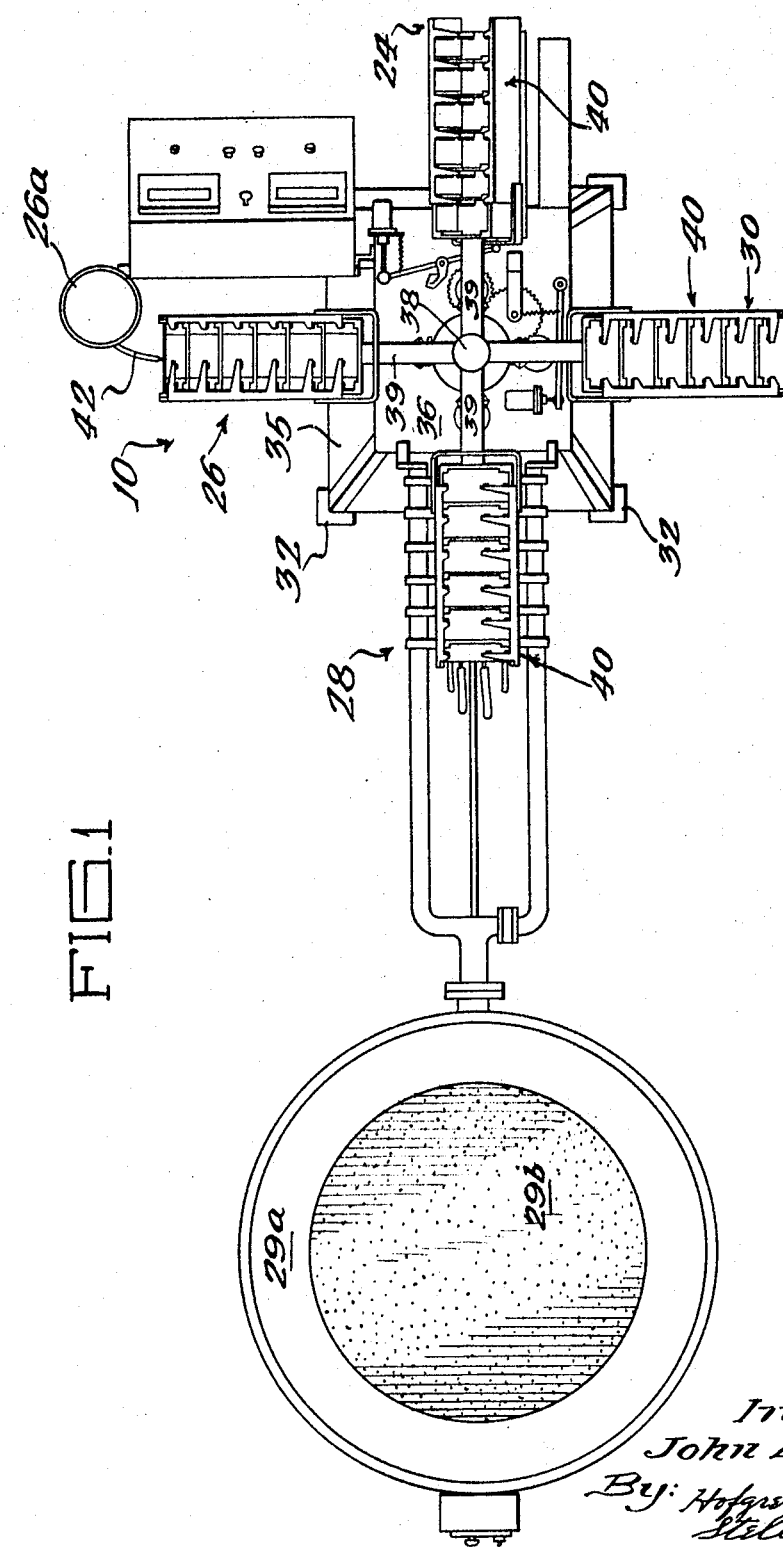
FIGURE 1 is a plan view of a battery element fabricating machine embodying this invention.
Figure 2:
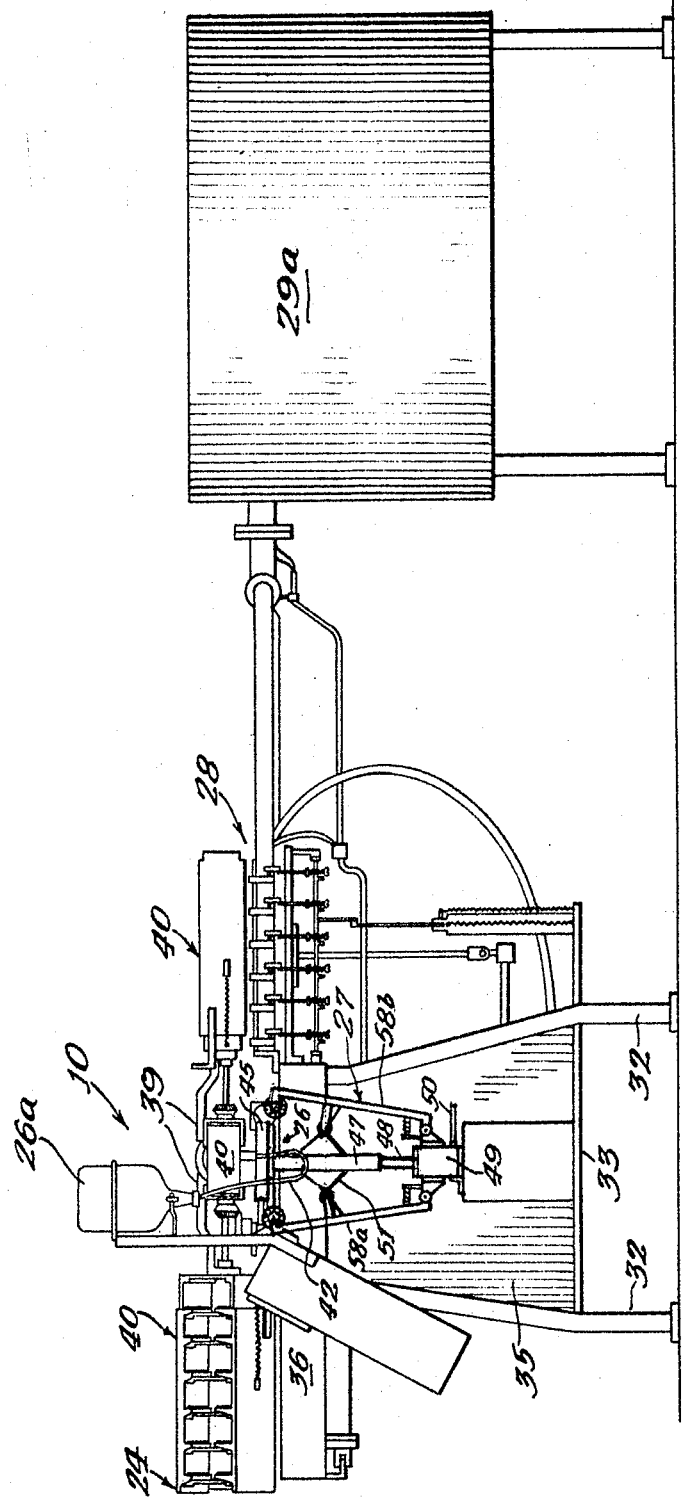
FIGURE 2 is a side elevational view of the battery element fabricating machine shown in FIGURE 1 with lug cleaning brushes shown in a position spaced away from the element carrier and with the fluxing tray moved to a position for normally engaging lugs of battery plates held in the element carrier.

As shown in FIGURES 1, 2 and 8, a fluid line 42 extends from flux pot 26a and terminates in a discharge spout 43 for dispensing fluxing solution 44 into the tray 45. If desired, the tray may be provided with a pair of spaced parallel sponges 46 against which the plate lugs may be abutted to absorb fluxing solution from the tray 45.

Tray 45 is mounted on a column 47 which is secured to a rod 48 of piston and cylinder device 49. An air line 50 extends from a source of air under pressure, and well known control means is provided for introducing air under pressure to the cylinder for forcing the rod 48 outwardly therefrom. Suitable means, such as return springs (not shown) may be provided for permitting the return or retraction of rod 48 relative to the cylinder upon release of the supply of air under pressure. Cam surfaces 51 are provided on opposite sides of column 47 for a purpose to be explained.

In the illustrated embodiment, the mechanical abrading means 27 includes a pair of circular cylindrical brushes 53 rotatably mounted on a shaft 54, by being concentrically arranged on sleeve 54a. A motor 55 is connected to each shaft 54 to rotate the same, with bearings 56 interposed between the shaft and the brush sleeves 54a to facilitate rotation of the shafts 54. While the brushes are shown as being a unitary structure, it is to be understood that a plurality of brushes could be "ganged" along a shaft 54.

The shafts 54 are mounted in the ends 57a and 57b of spaced generally U-shaped arms 58a and 58b. The lower ends 59a and 59b of the arms are pivoted at 60a and 60b about a shaft 61 thereby mounting the arms 58a and 58b, and the brushes 58 mounted on the arms, for pivotal movement through an arc as indicated by the arrow "A." The arms and brushes are positioned with respect to the fluxing station such that the brushes will engage the ends of the lugs 22 of plates 12 when the plates are brought to the fluxing station in group carriers 40 and the column 38 is in a dwell position as explained in my aforementioned copending application. In this relative position, motors 55 may be actuated by an appropriate signal in timed relationship to the arrival of the group carriers 40 at the fluxing station to rotate the brushes for a predetermined length of time, thereby removing oxides and other undesirable material from the surface of the lugs 22 by a mechanical abrading action.

Fingers 62 extend inwardly from the cross braces 58a' and 58b' of each arm 58a and 58b toward column 47. The free ends of the fingers are provided with follower means in the form of rollers 63 which track on the cam surfaces 51 of column 47. As column 47 moves to and fro in an upright direction indicated by the Arrow "B," the rollers 63 will track on cam surface 51 causing pivotal movement of the arms 58 and brushes 53 as represented by Arrows "A." Thus the brushes 53 are normally mounted in a position to engage lugs of plates presented to the fluxing station, and are movable away from this position responsive to movement of column 47 which supports fluxing tray 45.

During movement of the brushes away from the lugs occasioned by upright movement of column 47 responsive to actuation of cylinder 49, tray 45 travels upwardly adjacent legs 22 to a position wherein fluxing solution may be applied to the ends of the lugs as indicated in FIGURE 5. Following this movement, in response to an appropriately timed signal, air under pressure from line 50 is released, column 47 retracts and brushes 53 return to the normal position. Meanwhile the group carriers 40 are lifted by the action of column 38 and rotated to the casting station, another group carrier is brought to the fluxing station, and the cycle repeated.

This invention provides a novel means for mechanically abrading or cleaning the lugs of battery plates prior to immersion in a fluxing solution, so that the lugs of even "formed" plates will be adequately cleaned prior to transfer to the casting station. This is accomplished automatically in timed relationship to other operations of the fabricating process with minor alterations in the structure of presently available fabricating machines.

The foregoing detailed description has been given for clearness of understanding only, and no unnecessary limitations should be understood therefrom, as some modifications may be obvious to those skilled in the art.

I claim:

1. In a machine for fabricating storage battery elements composed of separators interposed between plates having lugs, a fluxing station, comprising: means for holding battery elements at the fluxing station with the plate lugs positioned generally exteriorly of the elements; flux container means at the fluxing station for holding flux solution therein, the flux container being mounted for movement toward and away from the element holding means; and abrading means at the fluxing station for mechanically cleaning the plate lugs, the abrading means being mounted on the machine for movement toward and away from the element holding means and being operatively connected to the flux holding means for movement of the abrading means toward and away from the element holding means responsive to movement of the flux holding means.

2. The fluxing station of claim 1 wherein the connection of the abrading means to the flux holding means is constructed and arranged to move the abrading means away from the element holding means responsive to movement of the flux holding means toward the element holding means.

3. The fluxing station of claim 2 wherein the element holding means comprises a carrier movably mounted in the machine for carrying battery elements to the fluxing station, holding the elements thereat for lug cleaning, and carrying elements away from the station for fabrication thereof, the abrading means being mounted on the machine in a position to engage the plate lugs when the carrier is initially positioned at the fluxing station, the flux holding means being initally postioned away from the carrier and the abrading means, movement of the flux holding means toward the carrier causing the abrading means to be moved out of engagement with the plate lugs.

4. The fluxing station of claim 2 wherein the abrading means includes rotatably mounted brushes, with means on the abrading means for rotating the brushes during engagement with the plate lugs.

5. The fluxing station of claim 4 wherein a pair of brushes are provided in generally parallel spaced relationship to each other, the brushes being positioned generally coextensive with the arrangement of lugs of plates held in the element holder.

6. In a machine for fabricating storage battery elements composed of separators interposed between plates having lugs, the fabricating machine being of the type having an element carrier mounted in the machine for movement to a fluxing station, a dwell position thereat, and movement away from the fluxing station; an improved fluxing station comprising:
lug cleaning brushes mounted on arms pivoted to the machine for movement of the brushes toward and away from the element carrier in the dwell position thereof;
a flux holding tray mounted on the machine; means to effect relative movement between the flux holding tray and the element carrier whereby to flux said element lugs at said dwell position; and
said means conformed to effect said movement of the brushes in synchronization with said relative movement of the tray and carrier.

7. In a machine for fabricating storage battery elements composed of separators interposed between plates having lugs, the fabricating machine being of the type having an element carrier mounted in the machine for movement to a fluxing station, a dwell position thereat, and movement away from the fluxing station; a fluxing station comprising: lug cleaning brushes mounted on arms pivoted to the machine for movement of the brushes toward and away from the element carrier in the dwell position thereof, said arms having outwardly extending followers thereon; a flux holding tray mounted on a column for generally linear movement toward and away from the dwell position of the element carrier, the column having cam surfaces in a position to engage the followers of the brush arm during movement of the element carrier to thereby pivot the brush arms during linear movement of the tray column.

8. The fluxing station of claim 7 wherein the brushes are rotatably mounted on the arms in a position to normally lie between the tray and the element carrier.

9. The fluxing station of claim 8 wherein the brushes are also positioned on the arms to engage the lugs of plates held in the element carrier during the dwell of the carrier and prior to movement of the tray to the fluxing position.

10. The fluxing station of claim 9 wherein the brushes are connected to motor means for rotatably driving the brushes.

11. A machine as in claim 7 wherein the means to effect relative movement between the tray and the carrier comprises means to move the tray toward the carrier.

References Cited
UNITED STATES PATENTS

| | | | |
|---|---|---|---|
| 941,345 | 11/1909 | Humphreville | 15—34 |
| 1,997,694 | 4/1935 | Morick et al. | 228—40 X |
| 2,303,290 | 11/1942 | Michael | 118—421 X |
| 2,938,494 | 5/1960 | Wampler et al. | 118—74 |
| 3,208,088 | 9/1965 | Sulzberger et al. | |
| 3,300,803 | 1/1967 | Seakan. | |
| 3,336,622 | 8/1967 | Von Kullwitz et al. | |

MORRIS KAPLAN, Primary Examiner

U.S. Cl. X.R.

15—21; 118—72, 256, 421